(12) United States Patent
Ali et al.

(10) Patent No.: US 12,401,694 B1
(45) Date of Patent: *Aug. 26, 2025

(54) METHOD AND SYSTEM FOR MODIFYING AND VALIDATING API REQUESTS

(71) Applicant: Styra, Inc., Redwood City, CA (US)

(72) Inventors: Sayed Asad Ali, Mountain View, CA (US); Andrew Curtis, San Mateo, CA (US); Marco Sanvido, Belmont, CA (US); Timothy L. Hinrichs, Los Altos, CA (US); Teemu Koponen, San Francisco, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,679

(22) Filed: Jun. 3, 2024

Related U.S. Application Data

(63) Continuation of application No. 17/239,316, filed on Apr. 23, 2021, now Pat. No. 12,003,543.

(60) Provisional application No. 63/056,522, filed on Jul. 24, 2020.

(51) Int. Cl.
   *H04L 9/40* (2022.01)
(52) U.S. Cl.
   CPC ............ *H04L 63/20* (2013.01); *H04L 63/08* (2013.01); *H04L 63/123* (2013.01)
(58) Field of Classification Search
   CPC ........ H04L 63/20; H04L 63/08; H04L 63/123
   USPC ............................................................. 726/1
   See application file for complete search history.

(56) References Cited

U.S. PATENT DOCUMENTS

| | | |
|---|---|---|
| 5,974,549 A | 10/1999 | Golan |
| 6,985,953 B1 | 1/2006 | Sandhu et al. |
| 7,096,367 B2 | 8/2006 | Garg et al. |
| 7,124,192 B2 | 10/2006 | High, Jr. et al. |
| 7,752,661 B2 | 7/2010 | Hemsath et al. |
| 7,913,300 B1 | 3/2011 | Flank et al. |
| 8,266,694 B1 | 9/2012 | Roy |
| 8,613,070 B1 | 12/2013 | Borzycki et al. |

(Continued)

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

(Continued)

*Primary Examiner* — Benjamin A Kaplan
(74) *Attorney, Agent, or Firm* — ADELI LLP

(57) ABSTRACT

Some embodiments of the invention provide a method of modifying and validating API requests received at an API server. At a mutating admission controller of the API server, the method intercepts an API request received at the API server. The method invokes a mutating webhook to query a policy agent that includes a set of policies for modifying API requests. When the policy agent determines that the API request requires modifications based on an identified policy, the method performs the modifications and forwards the modified API request for validation by the API server. After validating the API request, the method intercepts the API request at a validating admission controller and invokes a validating webhook to query the policy agent to determine whether the API request is valid. When the policy agent determines that the API request is valid, the method forwards the API request to be admitted to a database.

20 Claims, 8 Drawing Sheets

(56) References Cited

U.S. PATENT DOCUMENTS

| | | |
|---|---|---|
| 8,683,560 B1 | 3/2014 | Brooker et al. |
| 8,782,744 B1 | 7/2014 | Fuller et al. |
| 8,789,138 B2 | 7/2014 | Reierson et al. |
| 9,397,990 B1 | 7/2016 | Taly et al. |
| 9,530,020 B2 | 12/2016 | Brandwine et al. |
| 9,578,004 B2 | 2/2017 | Greenspan et al. |
| 9,648,040 B1 | 5/2017 | Morkel et al. |
| 10,122,757 B1 | 11/2018 | Kruse et al. |
| 10,127,393 B2 | 11/2018 | Ferraiolo et al. |
| 10,182,129 B1 | 1/2019 | Peterson et al. |
| 10,257,184 B1 | 4/2019 | Mehta et al. |
| 10,353,726 B2 | 7/2019 | Duan |
| 10,454,975 B1 | 10/2019 | Sharifi Mehr |
| 10,469,314 B2 | 11/2019 | Ennis, Jr. et al. |
| 10,574,699 B1 | 2/2020 | Baer et al. |
| 10,592,302 B1 | 3/2020 | Hinrichs et al. |
| 10,592,683 B1 | 3/2020 | Lim et al. |
| 10,698,733 B1 | 6/2020 | Lee et al. |
| 10,715,514 B1 | 7/2020 | Threlkeld |
| 10,719,373 B1 | 7/2020 | Koponen et al. |
| 10,740,470 B2 | 8/2020 | Ionescu et al. |
| 10,789,220 B2 | 9/2020 | Mayer et al. |
| 10,984,133 B1 | 4/2021 | Hinrichs et al. |
| 10,986,131 B1 | 4/2021 | Kruse et al. |
| 10,990,702 B1 | 4/2021 | Hinrichs et al. |
| 11,023,292 B1 | 6/2021 | Hinrichs et al. |
| 11,080,410 B1 | 8/2021 | Sandall et al. |
| 11,108,827 B2 | 8/2021 | Beckman et al. |
| 11,108,828 B1 | 8/2021 | Curtis et al. |
| 11,170,099 B1 | 11/2021 | Sandall et al. |
| 11,228,573 B1 | 1/2022 | Rangasamy et al. |
| 11,245,728 B1 | 2/2022 | Curtis et al. |
| 11,258,824 B1 | 2/2022 | Hinrichs et al. |
| 11,327,815 B1 | 5/2022 | Koponen et al. |
| 11,347,806 B2 | 5/2022 | Tal et al. |
| 11,425,126 B1 | 8/2022 | Horal et al. |
| 11,470,121 B1 | 10/2022 | Curtis et al. |
| 11,477,238 B1 | 10/2022 | Curtis et al. |
| 11,477,239 B1 | 10/2022 | Curtis et al. |
| 11,494,518 B1 | 11/2022 | Curtis et al. |
| 11,496,517 B1 | 11/2022 | Hinrichs et al. |
| 11,502,992 B1 | 11/2022 | Koponen et al. |
| 11,509,658 B1 | 11/2022 | Kulkarni |
| 11,513,778 B1 | 11/2022 | Graves et al. |
| 11,516,253 B1 | 11/2022 | Van Deman et al. |
| 11,520,579 B1 | 12/2022 | Narkar et al. |
| 11,582,235 B1 | 2/2023 | Koponen et al. |
| 11,593,525 B1 | 2/2023 | Sandall et al. |
| 11,604,684 B1 | 3/2023 | Hinrichs et al. |
| 11,681,568 B1 | 6/2023 | Hinrichs et al. |
| 11,847,241 B1 | 12/2023 | Cahill et al. |
| 12,003,543 B1 | 6/2024 | Ali et al. |
| 12,021,832 B1 | 6/2024 | Koponen et al. |
| 12,107,866 B2 | 10/2024 | Hinrichs et al. |
| 12,118,102 B1 | 10/2024 | Sandall et al. |
| 2004/0083367 A1 | 4/2004 | Garg et al. |
| 2005/0114674 A1 | 5/2005 | Carley |
| 2007/0156670 A1 | 7/2007 | Lim |
| 2008/0184336 A1 | 7/2008 | Sarukkai et al. |
| 2009/0063665 A1 | 3/2009 | Bagepalli et al. |
| 2009/0077618 A1 | 3/2009 | Pearce et al. |
| 2009/0281996 A1 | 11/2009 | Liu et al. |
| 2010/0333079 A1 | 12/2010 | Sverdlov et al. |
| 2011/0113484 A1 | 5/2011 | Zeuthen |
| 2012/0030354 A1 | 2/2012 | Razzaq et al. |
| 2012/0066756 A1 | 3/2012 | Vysogorets et al. |
| 2012/0311672 A1 | 12/2012 | Connor et al. |
| 2012/0331539 A1 | 12/2012 | Matsugashita |
| 2013/0226970 A1 | 8/2013 | Weber et al. |
| 2014/0032691 A1 | 1/2014 | Barton et al. |
| 2014/0032759 A1 | 1/2014 | Barton et al. |
| 2014/0033267 A1 | 1/2014 | Aciicmez |
| 2014/0237594 A1 | 8/2014 | Thakadu et al. |
| 2015/0089575 A1 | 3/2015 | Vepa et al. |
| 2015/0213449 A1 | 7/2015 | Morrison et al. |
| 2015/0244724 A1 | 8/2015 | Xu et al. |
| 2016/0034900 A1 | 2/2016 | Nelsen et al. |
| 2016/0057107 A1 | 2/2016 | Call et al. |
| 2016/0188898 A1 | 6/2016 | Karinta et al. |
| 2017/0024428 A1 | 1/2017 | Patiejunas et al. |
| 2017/0111336 A1 | 4/2017 | Davis et al. |
| 2017/0161120 A1 | 6/2017 | Sasaki et al. |
| 2017/0220370 A1 | 8/2017 | Klompje et al. |
| 2017/0237729 A1 | 8/2017 | Uppalapati |
| 2017/0302655 A1 | 10/2017 | Sondhi et al. |
| 2017/0346807 A1 | 11/2017 | Blasi |
| 2017/0364702 A1 | 12/2017 | Goldfarb et al. |
| 2018/0067790 A1 | 3/2018 | Chheda et al. |
| 2018/0082053 A1 | 3/2018 | Brown et al. |
| 2018/0109538 A1 | 4/2018 | Kumar et al. |
| 2018/0309746 A1 | 10/2018 | Blasi |
| 2019/0007418 A1 | 1/2019 | Cook et al. |
| 2019/0007443 A1 | 1/2019 | Cook et al. |
| 2019/0080103 A1 | 3/2019 | Hadzic et al. |
| 2019/0190959 A1 | 6/2019 | Yuan |
| 2019/0230130 A1 | 7/2019 | Beckman et al. |
| 2019/0245862 A1 | 8/2019 | Kruse et al. |
| 2019/0273746 A1 | 9/2019 | Coffing |
| 2019/0386973 A1 | 12/2019 | Patwardhan et al. |
| 2020/0007580 A1 | 1/2020 | Liderman et al. |
| 2021/0029029 A1 | 1/2021 | Mehmedagic et al. |
| 2021/0240550 A1 | 8/2021 | Hinrichs et al. |
| 2021/0248017 A1 | 8/2021 | Hinrichs et al. |
| 2021/0365571 A1 | 11/2021 | Sandall et al. |
| 2022/0269549 A1 | 8/2022 | Koponen et al. |

OTHER PUBLICATIONS

Costa, Jeff, "Improve API Performance with Caching," API Gateway, May 31, 2018, 18 pages, Akamai Developer, retrieved from https://developer.akamai.com/blog/2018/05/31/improve-api-performance-caching.

Moffett, Jonathan D., et al., "Policy Hierarchies for Distributed Systems Management," IEEE Journal on Selected Areas in Communications, Dec. 1993, 11 pages, vol. 11, IEEE, USA.

Non-Published commonly Owned U.S. Appl. No. 16/050,119, filed Jul. 31, 2018, 55 pages, Styra, Inc.

Non-Published commonly Owned U.S. Appl. No. 18/120,810, filed Mar. 13, 2023, 63 pages, Styra, Inc.

Non-Published Commonly Owned U.S. Appl. No. 18/369,471, filed Sep. 18, 2023, 74 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, 6 pages, IEEE, London, UK.

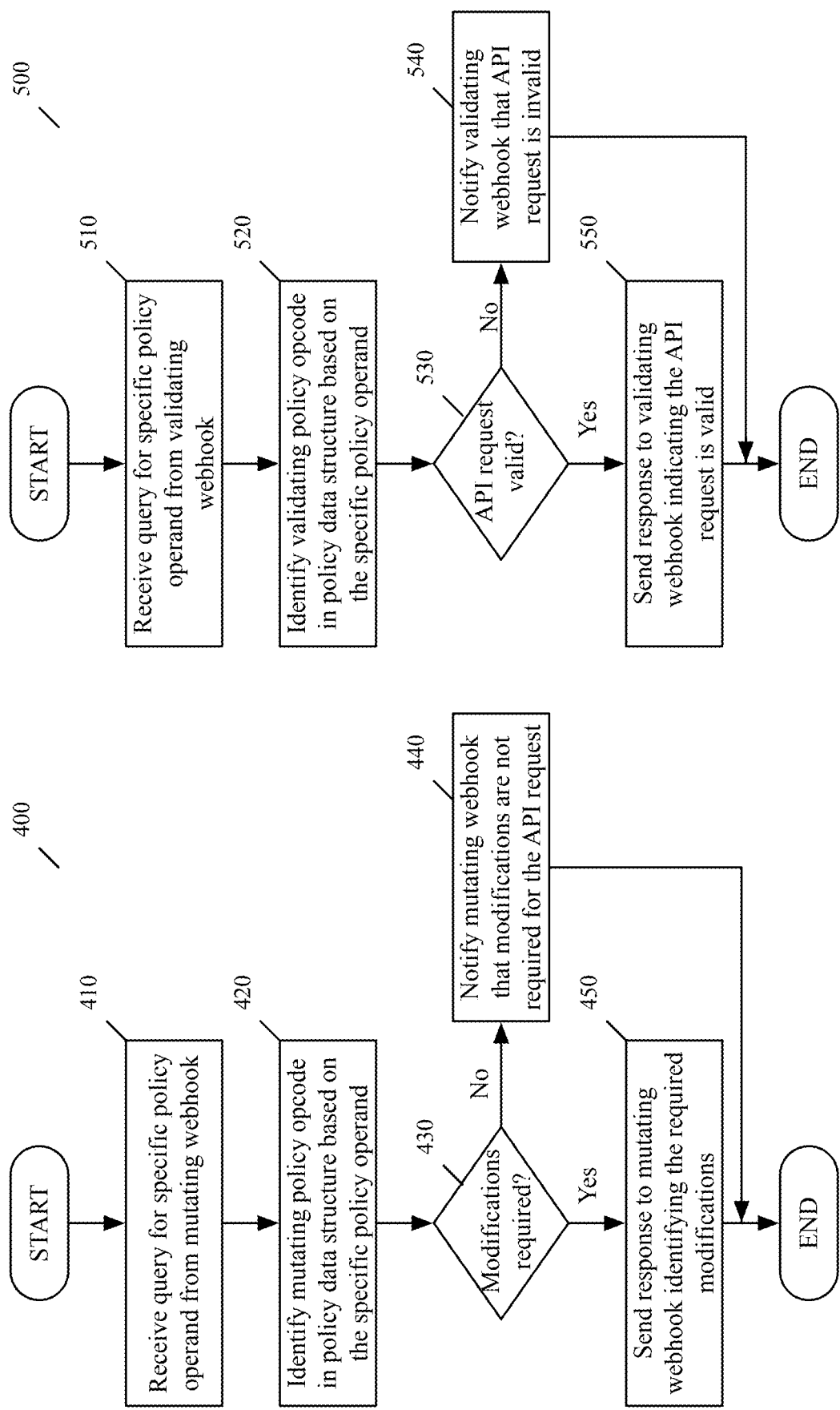

METHOD AND SYSTEM FOR MODIFYING AND VALIDATING API REQUESTS

CLAIM OF BENEFIT TO PRIOR APPLICATIONS

This application is a continuation application of U.S. patent application Ser. No. 17/239,316, filed Apr. 23, 2021, now issued as U.S. Pat. No. 12,003,543. U.S. patent application Ser. No. 17/239,316 claims the benefit of U.S. Provisional Patent Application 63/056,522, filed Jul. 24, 2020. U.S. patent application Ser. No. 17/239,316, now issued as U.S. Pat. No. 12,003,543, is incorporated herein by reference.

BACKGROUND

Most applications today use access control rules to allow different users with different privileges, different access to the applications and their resources. Typically, the access controls are coded within an application's code base, which makes it very difficult to modify these controls statically, and impossible to modify them dynamically while the application is running. This problem is especially acute for micro-service applications, which are often small, well-defined applications that perform a small set of operations. Incorporating complex access controls in these applications is not practical as such controls would burden these applications with unnecessary functional complexity that not only runs counter to the focus of these micro-service applications, but would also be difficult to maintain and update. Accordingly, most micro-service applications employ no access controls or the most rudimentary access controls.

BRIEF SUMMARY

Some embodiments of the invention provide a system for defining, distributing, and enforcing policies for modifying and validating API (application programming interface) requests received at an API server (also referred to herein as API server cluster or server set) in a datacenter. This system includes a mutating admission controller and a validating admission controller for performing mutating processes and additional validating processes on API requests received by the API server, respectively.

The mutating and validating admission controllers of some embodiments each invoke one or more webhooks for performing queries to determine whether API requests require mutations (also referred to herein as modifications) and whether API requests are valid, respectively. Some embodiments provide a method for processing API requests received at an API server. Following authentication and authorization by the API server of a user submitting an API request, the API request is intercepted by a mutating admission controller (e.g., mutating admission control plugin) of the API server in some embodiments. Upon intercepting the API request, the mutating admission controller in some embodiments invokes a mutating webhook for determining whether the API request requires modifications.

In some embodiments, the mutating webhook sends a query to an API authorizing policy agent to determine whether the API request requires modifications (e.g., based on custom defaults) before it is admitted (i.e., authorized/ approved). The mutating webhook in some embodiments is configured (e.g., by an administrator of the webhook) to query a specific data document from the API authorization policy agent. The API authorizing policy agent includes a policy data structure for storing (i) a set of policies for mutating API requests and (ii) a set of policies for validating API requests, according to some embodiments.

When the API authorizing policy agent determines that the API request requires modifications (e.g., based on an identified policy associated with the query), the API authorizing policy agent in some embodiments sends a response to the mutating webhook indicating the required modifications for the API request. In some embodiments, the mutating webhook then provides a patch (e.g., a JSON (JavaScript Object Notation) patch) that includes the modifications to the mutating admission controller, which, in turn, applies the patch to the API request. Alternatively, the mutating webhook in some embodiments directly returns a modified API request to the mutating admission controller. The mutating admission controller then forwards the mutated API request to the API server for validation, according to some embodiments. When modifications are not required, the API authorizing policy agent sends a response to the mutating webhook indicating that modifications are not required, and the API request is subsequently forwarded to the API server without modifications.

In some embodiments, after the API server validates the API request, the validating admission controller intercepts the request before it is admitted (i.e., authorized/approved). The validating admission controller in some embodiments then invokes a validating webhook to query the API authorizing policy agent in order to determine whether the API request is valid according to custom default validation policies (i.e., in addition to the validation checks performed by the API server). The validating webhook, like the mutating webhook, is configured to query a specific data document from the API authorizing policy agent, according to some embodiments.

When the API authorizing policy agent determines that the API request is valid (i.e., conforms to custom defaults for API requests) in some embodiments, it sends a response to the validating webhook indicating the API request is valid. In some embodiments, the validating webhook notifies the validating admission controller, which subsequently forwards the API request to be admitted (i.e., authorized/ approved). Conversely, when the API authorizing policy agent in some embodiments determines that the API request is invalid, it sends a response to the validating webhook indicating the API request is invalid. In some embodiments, the invalid API request is returned to the mutating admission controller to determine whether initial or additional modifications are necessary to make the API request valid. Alternatively, the validating webhook of some embodiments notifies the validating admission controller that the request is invalid, which, then sends a notification to the source of the API request indicating the API request is invalid.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 4 illustrates a process performed by an API authorizing policy agent when it receives a query from a mutating webhook, according to some embodiments.

FIG. 5 illustrates a process performed by the API authorizing policy agent when it receives a query from a validating webhook, according to some embodiments.

DETAILED DESCRIPTION

Figure 1:
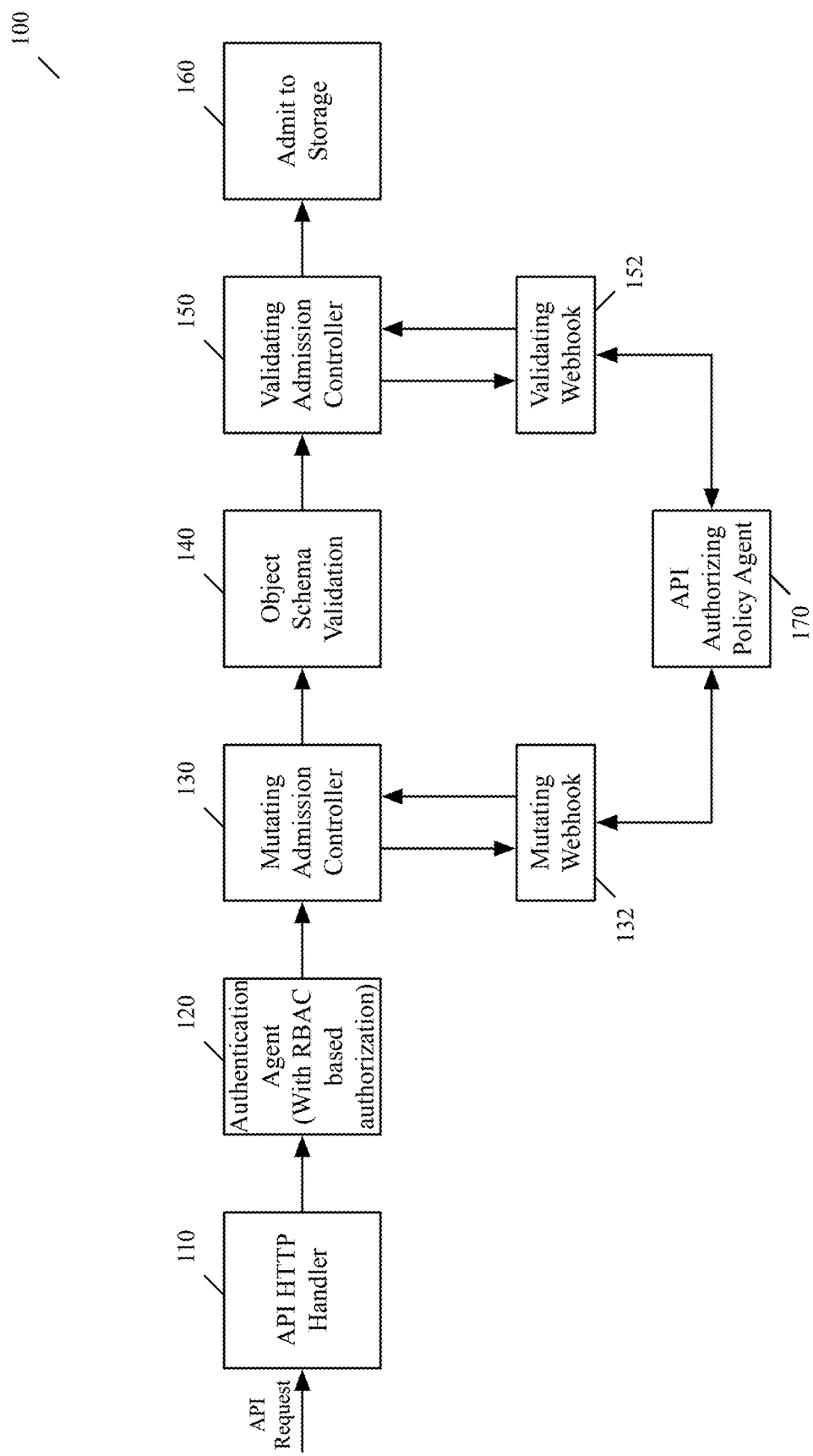
FIG. 1 conceptually illustrates a set of processes that perform operations on API requests received at an API server, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for defining, distributing, and enforcing policies for modifying and validating API (application programming interface) requests received at an API server (also referred to herein as API server cluster or server set) in a datacenter. This system includes a mutating admission controller and a validating admission controller for performing mutating processes and additional validating processes on API requests received by the API server, respectively.

The mutating and validating admission controllers of some embodiments each invoke one or more webhooks for performing queries to determine whether API requests require mutations (also referred to herein as modifications) and whether API requests are valid, respectively. Some embodiments provide a method for processing API requests received at an API server. Following authentication and authorization by the API server of a user submitting an API request, the API request is intercepted by a mutating admission controller (e.g., mutating admission control plugin) of the API server in some embodiments. Upon intercepting the API request, the mutating admission controller in some embodiments invokes a mutating webhook for determining whether the API request requires modifications.

In some embodiments, the mutating webhook sends a query to an API authorizing policy agent to determine whether the API request requires modifications (e.g., based on custom defaults) before it is admitted (i.e., authorized/approved). The mutating webhook in some embodiments is configured (e.g., by an administrator of the webhook) to query a specific data document from the API authorization policy agent. The API authorizing policy agent includes a policy data structure for storing (i) a set of policies for mutating API requests and (ii) a set of policies for validating API requests, according to some embodiments.

When the API authorizing policy agent determines that the API request requires modifications (e.g., based on an identified policy associated with the query), the API authorizing policy agent in some embodiments sends a response to the mutating webhook indicating the required modifications for the API request. In some embodiments, the mutating webhook then provides a patch (e.g., a JSON (JavaScript Object Notation) patch) that includes the modifications to the mutating admission controller, which, in turn, applies the patch to the API request. Alternatively, the mutating webhook in some embodiments directly returns a modified API request to the mutating admission controller. The mutating admission controller then forwards the mutated API request to the API server for validation, according to some embodiments. When modifications are not required, the API authorizing policy agent sends a response to the mutating webhook indicating that modifications are not required, and the API request is subsequently forwarded to the API server without modifications.

In some embodiments, after the API server validates the API request, the validating admission controller intercepts the request before it is admitted (i.e., authorized/approved). The validating admission controller in some embodiments then invokes a validating webhook to query the API authorizing policy agent in order to determine whether the API request is valid according to custom default validation policies (i.e., in addition to the validation checks performed by the API server). The validating webhook, like the mutating webhook, is configured to query a specific data document from the API authorizing policy agent, according to some embodiments.

When the API authorizing policy agent determines that the API request is valid (i.e., conforms to custom defaults for API requests) in some embodiments, it sends a response to the validating webhook indicating the API request is valid. In some embodiments, the validating webhook notifies the validating admission controller, which subsequently forwards the API request to be admitted (i.e., authorized/approved). Conversely, when the API authorizing policy agent in some embodiments determines that the API request is invalid, it sends a response to the validating webhook indicating the API request is invalid. In some embodiments, the invalid API request is returned to the mutating admission controller to determine whether initial or additional modifications are necessary to make the API request valid. Alternatively, the validating webhook of some embodiments notifies the validating admission controller that the request is invalid, which, then sends a notification to the source of the API request indicating the API request is invalid.

FIG. 1 conceptually illustrates an example embodiment of a set of processes 100 that perform operations on API requests received at an API server. As shown, the processes 100 include an API handler 110, an authentication agent with RBAC (role-based access control) authorization 120, mutating admission controller 130, object schema validation 140, validating admission controller 150, and admit to storage 160. It should be noted that the set of processes 100 can include additional or fewer processes than illustrated, and can be implemented in systems other than those described herein.

The API handler 110 is the module that initiates the authentication and authorization processes for each API request. In some embodiments, the API handler is implemented by authentication and/or authorization code of API processing modules, which will be described further below with reference to FIG. 6. In other words, this handler is implemented in some embodiments by authentication and authorization code within each API processing object of an application (not shown). The authentication agent with RBAC authorization 120 then performs authentication and RBAC authorization of the user from which the API request originated to ensure that the user is authorized to submit the API request.

The mutating admission controller 130 and the validating admission controller 150 are admission control plugins registered with the API server to intercept API requests received by the API server after the requests are authenticated and authorized (e.g., by the authentication agent with RBAC authorization 120) and before the requests are admitted to (i.e., authorized/approved to access) a database (e.g., namespace) of the API server, according to some embodiments. Due to limitations of admission controllers (e.g., limited request scope, lack of support for read requests, etc.), the mutating admission controller 130 includes a mutating webhook 132 and the validating admission controller 150 includes a validating webhook 152, as shown.

Through the mutating webhook 132 and the validating webhook 152, the mutating and validating admission controllers 130 and 150 can allow a user (e.g., administrator) of the webhooks to modify and validate API requests received by the API server (i.e., through user-defined policies), according to some embodiments. In some embodiments, rules for the mutating webhook 132 and the validating webhook 152 can be edited and validated by the user through a user interface (UI). For example, the webhooks in some embodiments are configured to each query a specific data document (also referred to herein as a policy operand) from the API authorizing policy agent 170, as mentioned above.

In some embodiments, the API authorizing policy agent 170 is general-purpose policy engine that decouples policy decision-making from policy enforcement. For example, some embodiments utilize open policy agent (OPA), which is an open source, general-purpose policy engine for enforcing policies in micro-services, Kubernetes, CI/DC pipelines, API gateways, etc. OPA operates by generating policy decisions based on evaluations of query input against policies (also referred to herein as policy opcodes) and stored data (e.g., operands). Additional information regarding OPAs can be found at www.openpolicyagent.org.

As the API authorizing policy agent 170 decouples policy decision-making from policy enforcement, it is not accessible directly by any registered components of the API server and is accessible only through the webhooks 132 and 152, according to some embodiments. When the API authorizing policy agent 170 receives a query for a specific policy operand from either of the webhooks 132 and 152 in some embodiments, it matches the specific policy operand indicated in the query with a policy opcode from its policy data structure. The policy data structure allows the API authorizing policy agent to only match against policy opcodes relevant to the specific policy operand indicated in the query rather than performing a series of if-and checks, according to some embodiments.

In some embodiments, the policy data structure is a single storage structure (e.g., a namespace) that stores the mutating and validating policies as one or more lines of opcode (i.e., as one or more opcode expressions/statements). The single storage structure in some embodiments stores policy operands along with the policy opcodes. The policy opcodes in some embodiments are written in a high-level declarative language (e.g., Rego). Also, in some embodiments, the policy operands are written in a language-independent, structured format, such as JSON format or YAML (initially, "Yet Another Markup Language" and later, YAML Ain't Markup Language). Typically, such formats (e.g., JSON, YAML, etc.) are human readable. Alternatively, or conjunctively, in some embodiments, the policy operands are expressed in other formats, e.g., binary format, etc.

The mutating policy opcodes dictate the changes required to API requests when a user attempts to create, update, or delete resources associated with the API request at the time of admission control (i.e., does not change existing resources of the API server), according to some embodiments. The validating policy opcodes in some embodiments dictate whether a user's API request to create, update, or delete a resource is permitted. In some embodiments, if a modification to an API request is rejected by a validating policy opcode, the policy opcode dictates what error message to return to the user.

The mutating and validating policy opcodes in some embodiments also include pre-built sets of policy opcodes that naturally belong together. For example, some embodiments include a list of the most common and impactful rules that most clusters should implement first (e.g., best practices policy opcodes), policy opcodes for the API authorizing policy agent that are mapped to PCI DSS (payment card industry data security standard) clauses, and pod security policy opcodes that help limit permissions that the pods run under. Pre-built validating policy opcodes can also include policy opcodes used to guard existing resources, in some embodiments, such as policy opcodes that span the traditional silos of computing, networking, and storage, and that are motivated by a mix of operations, security, and compliance.

For queries from the mutating webhook 132, the API authorizing policy agent 170 provides the required modifications (e.g., as indicated in the matched policy opcode) to the mutating webhook in response to the query, which the webhook then provides to the mutating admission controller 130 in the form of a patch (e.g., JSON patch) to be applied to the API request, according to some embodiments. Alternatively, the mutating webhook in some embodiments directly returns a modified API request to the mutating admission controller instead of returning a patch.

In some embodiments, responsive to queries from the validating webhook 152, the API authorizing policy agent 170 simply provides a decision indicating whether the API request is valid or invalid based on the matched policy. Alternatively, the validating policy opcodes of some embodiments include a specific message to return to the validating webhook in some embodiments. Additional details regarding the specific processes performed by the webhooks and API authorizing policy agent will be described below with reference to FIGS. 2, 3, 4, and 5.

Figure 2:
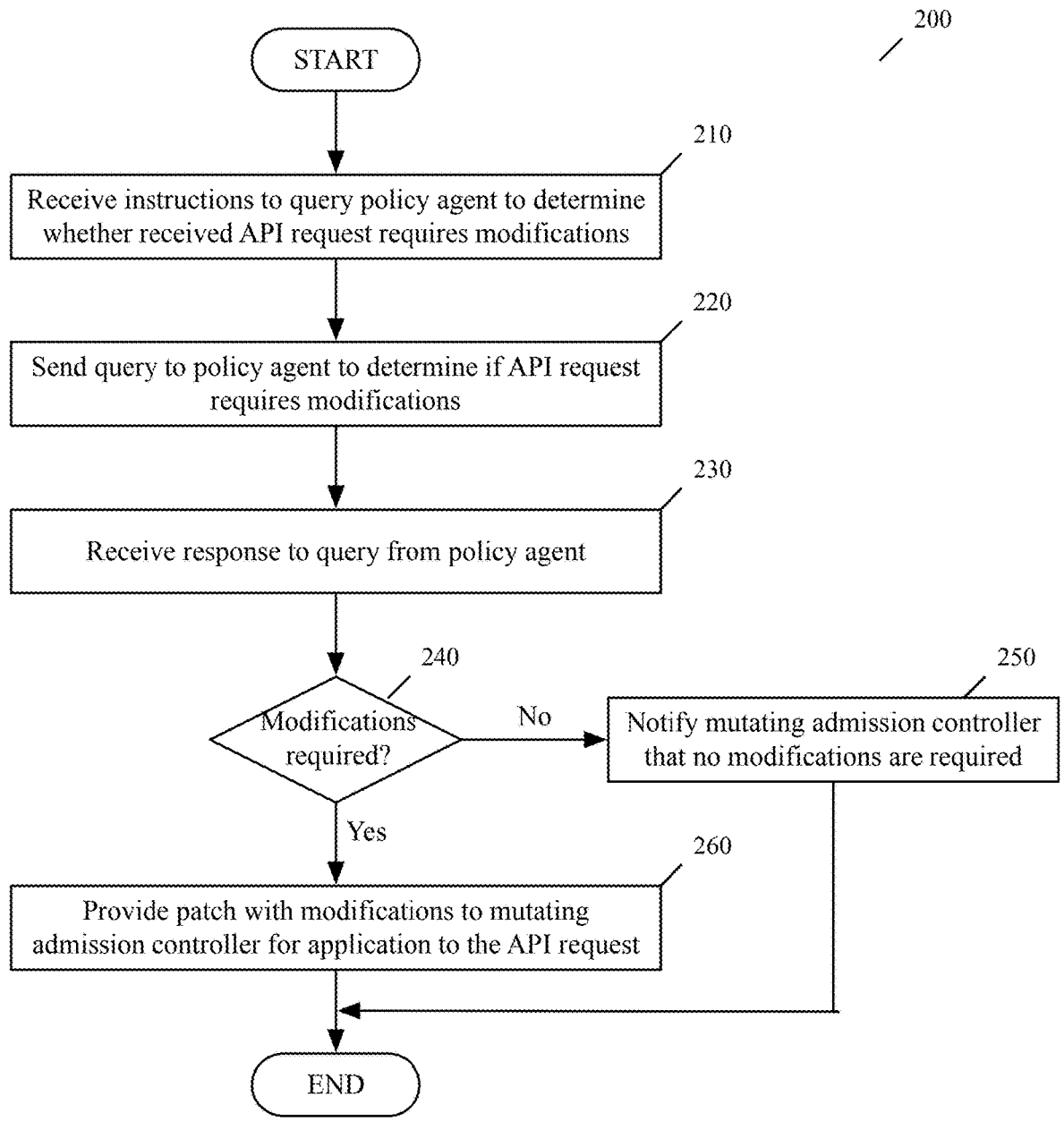
FIG. 2 illustrates a process performed by a mutating webhook to determine whether an API request requires modifications, according to some embodiments.

FIG. 2 illustrates a process performed in some embodiments by a mutating webhook to determine whether an API request requires modifications. As shown, the process 200 starts at 210 by receiving instructions from a mutating admission controller to query an API authorizing policy agent to determine whether an API request intercepted by the mutating admission controller requires modifications. For example, in the example embodiment of FIG. 1 described above, the mutating webhook 132 can receive instructions from the mutating admission controller 130 to query the API authorizing policy agent 170. The process then sends (at 220) a query to the API authorizing policy agent to determine if the API request requires modifications.

Next, the process receives (at 230) a response to the query from the API authorizing policy agent, and then determines (at 240) whether the response indicates modifications to the API request are required. Examples of modifications that can be performed on API requests in some embodiments include fixes/enhancements (e.g., injecting missing labels to ensure that the named set of labels exist and any missing labels are added with their corresponding default values), constraints (e.g., adding default CPU (central processing unit) and/or memory limits to ensure that container CPU and/or memory limit is set to a default value unless otherwise specified), deletion of data (e.g., removing references to a local file system to ensure containers cannot mount any volumes from the local file system), and addition of data (e.g., adding namespace labels to resources to ensure that the designated namespace labels are copied to all resources, or adding additional clauses to API requests that include database queries).

For example, some embodiments include mutating policy opcodes that specify that an API requests for a container must include a transport proxy as a sidecar to the container, and thus if such an API request lacks the transport proxy, the mutating webhook can provide a patch to the mutating admission controller to inject a transport proxy sidecar into the request. In another example, a mutating policy opcode can specify to remove all references to a local file system in order to prevent containers from mounting any files from the local system. In a third example, some embodiments may include mutating policy opcodes for limiting CPU and/or memory usage of containers. In some embodiments, these limits can be a default policy opcode or, alternatively, a custom default chosen by a user (e.g., network administrator). In some embodiments, the specific policy operands queried can also vary between API requests for different resources. Additionally, some embodiments may include policy opcodes that are tailored to their specific environment (e.g., as defined by an administrator of that specific environment).

When the process determines at 240 that modifications to the API request are not required, the process transitions to 250 to notify the mutating admission controller that modifications are not required for the API request. The process then ends. Otherwise, when the process determines at 240 that the API request does require modifications, the process transitions to 260 to provide a patch to the mutating admission controller for application to the API request, the patch including all of the required modifications. Alternatively, some embodiments provide the mutating webhook with the required modifications for the mutating webhook to directly modify the API request and return the modified API request to the mutating admission controller. After the modifications have been provided to the mutating webhook at 260, the process then ends.

As described above, after the API request has been modified, or, alternatively, after the mutating admission controller receives a notification from the mutating webhook that no modifications are required, the mutating admission controller forwards the API request to the object schema validation 140, which validates the form of API requests received by the API server, according to some embodiments. After validating the API request, the object schema validation 140, in some embodiments, forwards the API request along to be admitted (i.e., authorized/approved to access a database of the API server), at which time the API request is then intercepted by the validating admission controller 150.

Figure 3:
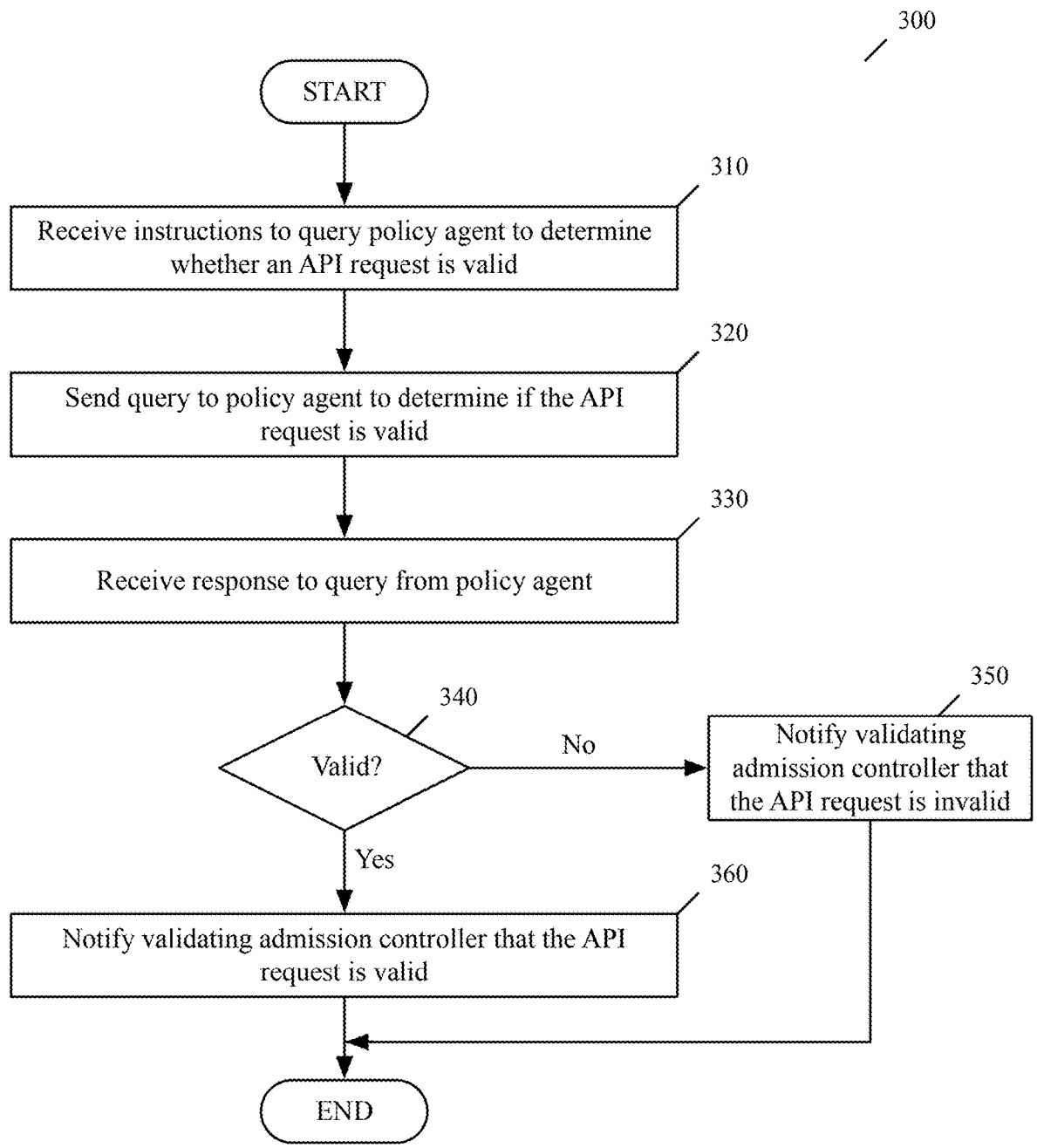
FIG. 3 illustrates a process performed by a validating webhook to determine whether an API request is valid, according to some embodiments.

FIG. 3 illustrates a process performed in some embodiments by a validating webhook for validating an API request. The process 300 starts at 310 by receiving instructions to query the API authorizing policy agent to determine whether an API request is valid. The validating webhook in some embodiments allows invariants to be enforced on particular API resources to ensure that the resource remains invariant. In some embodiments, API requests may be rejected in order to enforce custom admission policy opcodes (i.e., in addition to those enforced by the API server). The process then sends (at 320) a query to the API authorizing policy agent to determine if the API request is valid.

At 330, the process receives a response to the query from the API authorizing policy agent and determines, at 340, whether the response indicates the API request is valid. The response provided to the validating webhook varies structurally from the response provided to the mutating webhook, in some embodiments, due to the mutating webhook having the ability to modify API requests (i.e., by providing a patch to the mutating admission controller).

When the process determines at 340 that the API request is determined to be invalid, the process transitions to 350 to notify the validating admission controller that the API request is invalid. The process then ends. Otherwise, when the process determines at 340 that the API request is determined to be valid, the process transitions to 360 to notify the validating admission controller that the API request is valid. In some embodiments, the response received by the validating webhook includes a simple decision of "allowed" when the API request is determined to be valid. The process then ends.

In some embodiments, validating policy opcodes can include a specific message to return to the validating webhook. For example, the validating policy opcode may specify that when the validating admission controller receives notification that the API request is invalid, it must return the request to the mutating admission controller to determine whether initial or additional modifications to the API request are required (i.e., in order to make the request valid). In other embodiments, the validating admission controller may be instructed to send a notification to the source of the API request indicating that the request is invalid and has been denied. Also, as described above and below, when the API request is determined to be valid, the validating admission controller of some embodiments forwards the validated API request to be admitted to (i.e., authorized/approved to access) a database of the API server to complete the request. In some embodiments, admitting the API request to the database causes data to be persisted to storage, such as when the API request is a REST API. Alternatively, or conjunctively, admitting the API request to the database does not result in data being persisted in some embodiments, such as when the API request is a database query.

FIG. 4 illustrates a process performed by the API authorizing policy agent, in some embodiments, when it receives a query from a mutating webhook. The process 400 starts at 410 by receiving a query for a specific policy operand from a mutating webhook. As described above, the webhooks are configured in some embodiments to query specific policy operands from the API authorizing policy agent.

After receiving the query, the process identifies (at 420) a mutating policy opcode from its policy data structure based on the queried specific policy operand. The process then determines (at 430) whether the identified mutating policy opcode indicates modifications to the API request are required. As described above, mutating policy opcodes in some embodiments can include fixes/enhancements, constraints, deletion of data, and addition of data. For example, a mutating policy opcode can indicate that every API request must have a department tag indicating the department to which the user submitting the API request belongs. Thus, an API request that does not include a user's department tag, can be modified to add the applicable department tag to the API request, according to some embodiments. Similarly, an API request that includes an incorrect department tag can be modified by removing the incorrect tag and adding the correct one.

When the process determines (at 430) that the identified policy opcode indicates modifications to the API request are not required, the process transitions to 440 to notify the mutating webhook that modifications are not required for the API request. The process then ends. Otherwise, when the process determines (at 430) that the identified policy opcode indicates modification to the API request are required, the process transitions to 450 to send a response to the mutating webhook identifying the required modifications. The process then ends.

FIG. 5 illustrates a process performed by the API authorizing policy agent, in some embodiments, when it receives a query from a validating webhook. The process 500 starts at 510 by receiving a query for a specific policy operand from a validating webhook. After receiving the query, the process identifies (at 520) a validating policy opcode from its policy data structure based on the queried specific policy operand.

The process next determines (at 530) whether the identified validating policy opcode indicates that the API request is valid. For example, a validating policy opcode can be defined to prevent modifications to existing resources of the API server by denying such requests. In another example, some embodiments include a validating policy opcode for ensuring the integrity of API requests that have been modified (i.e., to verify that the modifications were correctly applied). When the process determines (at 530) that the identified validating policy opcode indicates that the API request is invalid, the process transitions to 540 to notify the validating webhook that the API request is invalid. In some embodiments, as with the example validating policy opcode described above, an API request intended to modify existing resources of the API server may be deemed invalid. Alternatively, the identified validating policy opcode of some embodiments can include a specific message to return to the validating webhook as also described above. For example, the validating policy opcode in some embodiments may indicate that the API request should be sent back to the mutating admission controller if the API request can be fixed through modifications (e.g., by adding missing data).

When the process determines (at 530) that the identified validating policy opcode indicates that the API request is valid, the process transitions to 550 to send a response to the validating webhook that the API request is valid. The process then ends. In some embodiments, after the validating webhook notifies the validating admission controller that an API request is valid, the validating admission controller forwards the API request to be admitted to a database of the API server to complete the request.

In some of the examples described above, an API request is admitted (i.e., authorized) to allow access to a database through the API server to which the API request is directed. In other embodiments, the API server performs different operations than providing access to a database. Hence, once an API validation agent authorizes the API request and the API request is provided to the API server, the API server performs any operation associated with the API request. In some of these embodiments, the API server provides a reply message to the source of the API request to indicate the completion of this operation. In some cases, this operation requires an output to be generated and returned to the source of the API request or to some other destination, as will be described further below.

Figure 6:
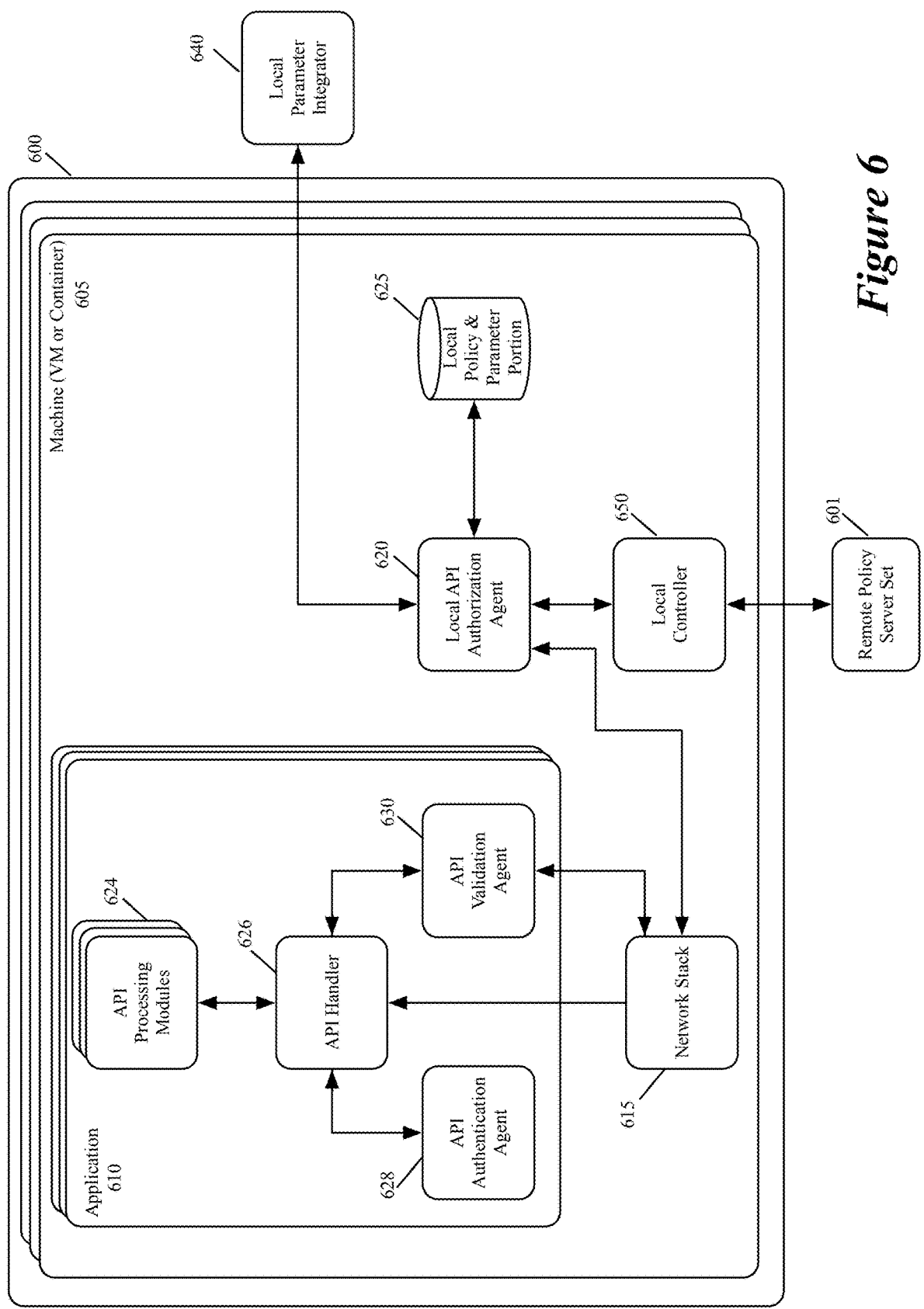
FIG. 6 illustrates the host-side software architecture of an API-authorization system of some embodiments.

FIG. 6 illustrates the host-side software architecture of an API-authorization system of some embodiments. Specifically, it illustrates a host computer 600 on which multiple machines 605 (e.g., multiple VMs or containers) execute. On each machine 605, multiple applications 610 can execute to process API calls from other modules on the host computer 600 or on other host computers or devices in the same datacenter or outside of the datacenter.

In addition to these applications, each machine 605 also has a network stack 615, a local controller 650, and a local API-authorizing agent 620. The network stack 615 is a software communication stack (e.g., TCP/IP stack) that implements a network communication protocol suite to allow the applications and processes of the machine 605 to communicate with each other, and with applications and processes executing outside of this machine (e.g., on the same host computer 600 or on other computers or devices). When the machine 605 is a container, its network stack is the network stack of the VM or operating system on which the container executes. Also, the network stack of a machine often connects with another module (e.g., a software switch) on the host computer, which, in turn, interfaces with a physical network interface card (NIC) of the host computer.

One set of communications that the network stack 615 facilitates is the communication between an application's API-validation agent 630 on an application and the local API-authorizing agent 620. As further described above and below, the network stack passes RPC data messages between the application API-validation agent 630 and the local agent 620. The local agent 620 enforces API-authorization policies for the applications that execute on the machine 605. Specifically, from the application API-validation agents 630 of the machine 605, the local API-authorizing agent 620 receives API-authorization requests for different APIs that the applications 610 receive.

For each such request, the local agent 620 retrieves the API-authorization policy associated with the request (i.e., associated with API call to which the request pertains) from its local policy and parameter storage 625. The local agent 620 retrieves this policy by using one or more parameters that are associated with the API call and that were received with the API call or the API-authorization request. From the policy/parameter storage, the local agent 620 can also retrieve one or more parameters for evaluating this policy.

The local storage 625 stores policies and parameters previously provided to the local agent 620 by the local controller 650, which receives the policies from the server set 601. In some embodiments, the local controller 650 also provides decision logs generated by the local agent 620 to the server set 601. In addition to storing policies and parameters from the server set 601, the local storage 625 of some embodiments also stores parameters that the local agent previously received from a local parameter integrator 640. This integrator allows an entity in the datacenter (e.g., a tenant or a department) to separately provide some or all of the parameters for evaluating the API-authorization policies. For instance, this integrator allows the entity to export highly confidential parameters into an API-authorization policy enforcement node without providing these parameters to the server set 601.

The local agent 620 then evaluates the retrieved policy based on parameter(s) received with the API-authorization request, or retrieved from the local storage 625. Based on its evaluation, the local agent then determines whether the API call should be approved or rejected. The local agent then sends the application API-validation agent 630 that sent the API-authorization request, a reply to specify whether the API call should be approved or rejected. In some embodiments, the API-validation agent 630 sends the API-authorization requests as RPC (Remote Procedure Call) messages, and the local agents send their replies to these requests as RPC reply messages.

In the example illustrated in FIG. 6, each machine 605 has its own local API-authorization agent 620. Each such local agent 620 on a machine 605 can process API-authorization requests from one or more applications 610 executing on the machine. Having the local agent 620 operate on the same machine as its associated application 610 is beneficial as in this way, both these components operate in the same failure domain, which improves agent's availability and its speed of processing API-authorization requests. However, in other embodiments, the applications on multiple machines on a host computer share the same local agent. For instance, in some embodiments, the local agent operates as a service VM or container on a host computer, and applications on multiple VMs and/or containers use this agent to have their API calls authorized. Instead of having the local agent operate as a service VM or container in the user space, other embodiments have the local agent operate as another type of process on the host computer that is accessed by multiple applications on multiple VMs and/or containers on a host computer.

As shown in FIG. 6, each application has an API handler 626, an API-authentication agent 628, and one or more API processing modules 624, in addition to the API-validation agent 630. An API processing module 624 is a module (e.g., an object) that performs an operation based on API call to it. The API-authentication agent 628 is the module that authenticates the identity of the API-call's source (e.g., validates the access credentials associated with the API call). When the API call is authenticated, the API-validation agent 630 determines whether the API call is authorized (i.e., whether the operation associated with the API call should be performed). The API handler 626 is the module that initiates the authentication operation and authorization operation for each API call. In some embodiments, the API handler is implemented by authentication and/or authorization code of the API processing modules (e.g., this handler is implemented in some embodiments by authentication and authorization code within each API processing object of an application).

Figure 7:
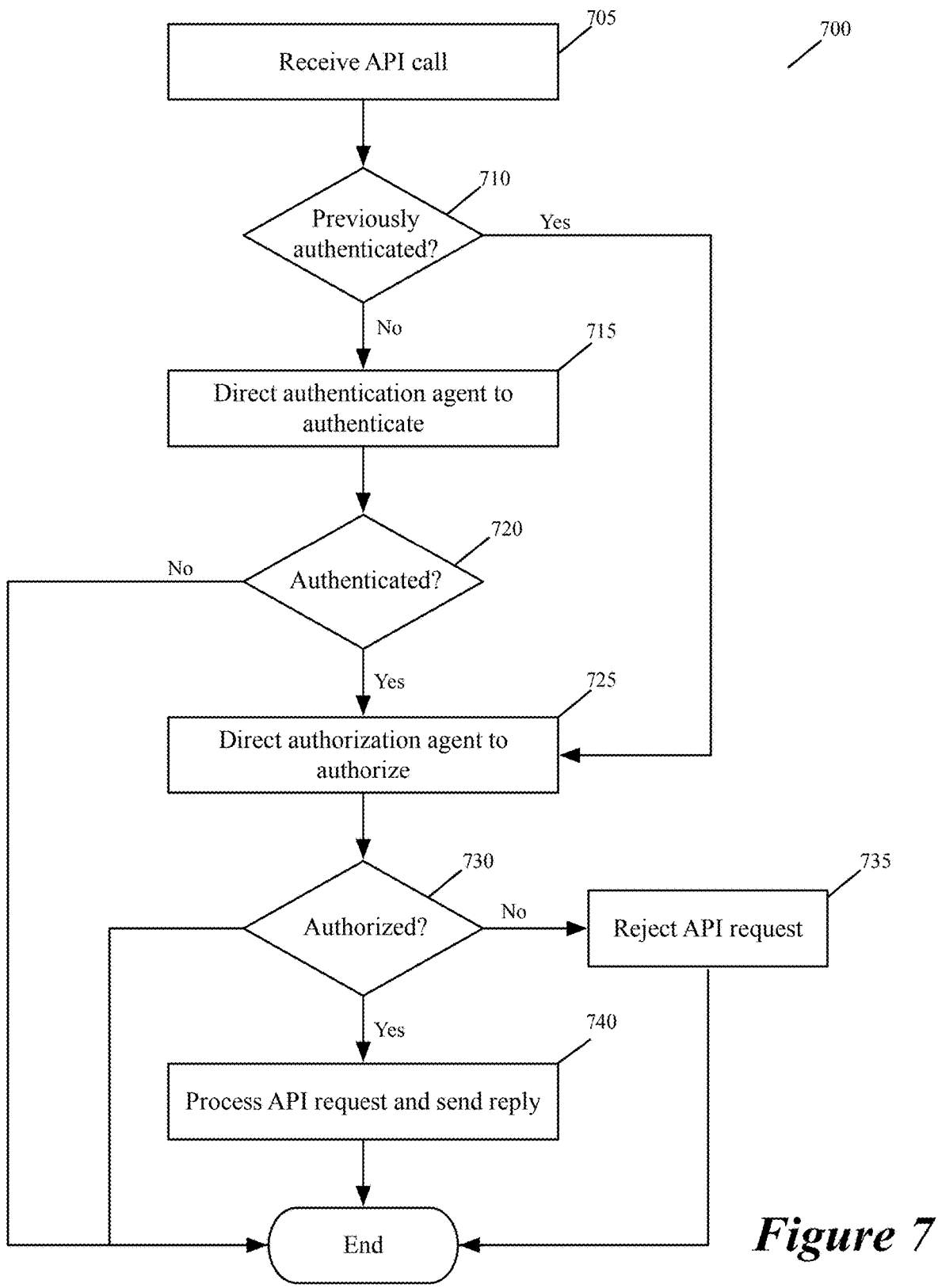
FIG. 7 illustrates a process that an application performs when it receives an API call, according to some embodiments.

To further explain the operations of the components of the application 610, FIG. 7 illustrates a process 700 that an application 610 performs when it receives (at 705) an API call. In some embodiments, the application 610 performs this process only for an API call that relates to an application infrastructure operation. In other words, an application 610 does not call the local agent 620 in some embodiments for API calls that relate to an application's core logic operations. In other embodiments, the local agent 620 handles API-authorization requests for both core logic API calls and infrastructure logic API calls.

When an API call is received, it has to be authenticated in some embodiments to validate the identity of the source of the API call. The API handler 626 uses the API-authentication agent 628 to authenticate the identity of the source of the API call, e.g., to authenticate the credential set (e.g., certificate, username and/or password) accompanying the API call. Accordingly, as shown, the API handler 626 initially determines (at 710) whether the received API call is part of a communication session that was previously authenticated by the API-authentication agent 628 (e.g., part of a communication session that the API-authentication agent 628 previously stored a cookie). If so, the process transitions to 725, which will be further described below. Otherwise, when the API call is not part of a communication session that was previously authenticated, the API handler 626 directs (at 715) the API-authentication agent 628 to authenticate the API call. In some embodiments, each API call has to be independently authenticated irrespective of whether any prior API call in the same communication session has been authenticated.

In some embodiments, the API-authentication agent 628 authenticates (at 715) the identity of the source of the API call by authenticating the credential set that is part of the API call. The application receives an API call as part of one or more data messages, each of which has a header and a payload. The payload of each such message contains all or part of the API call and one or more associated parameters, e.g., parameters that provide the credentials (e.g., username, password, user identifier, group identifier, certificate, etc.) of the source of the API call.

In some embodiments, the API-authentication agent 628 uses modules (e.g., third-party credential authenticating programs) executing outside of the application 610 to authenticate the API call. In these embodiments, the API-authentication agent 628 passes a set of source-identifying parameters that identifies the source of the API call to the external module, so that this module can authenticate the source of the API call. One or more parameters in this set can be parameters that were received with the API call.

After directing (at 715) the authentication agent to authenticate the source of the API call, the API handler (at 720) determines whether the API-authentication agent 628 reply indicates that the API call has been authenticated. If not, the API handler discards the API call and the process 700 ends. In some embodiments, the API handler 626 not only discards the API call but also sends a reply to the source of the API call to reject the call.

On the other hand, when the API-authentication agent 628 authenticates the source of the API call, the API handler 626 directs (at 725) the application API-validation agent 630 to validate the API call. In response, the application API-validation agent 630 sends an API-authorization request to the local API-authorizing agent 620. To do this, application API-validation agent 630 generates (at 725) an RPC message to the local agent 620 to pass along this request with information about the API call (e.g., one or more parameters that describe the API call and one or more parameters associated with this call). The network stack 615 passes this RPC message to the local agent 620.

After receiving the API-authorization request from application API-validation agent 630, the local agent 620 uses (at 725) one or more of the received parameters to retrieve a policy for validating the API call from the local storage 625. In the embodiments in which the local storage 625 stores the policy and associated parameters in a namespace, the local agent uses one or more of the parameters in the API-authorization request to retrieve policy opcode related to the API call from the namespace. To evaluate this policy opcode, the agent might also retrieve parameters (e.g., policy operands) from the local storage (e.g., from the namespace) that are associated with the retrieved policy.

The local agent then uses the received parameter set and/or retrieved parameter set to evaluate the retrieved API-authorization policy (e.g., the retrieved opcode) in order to determine whether the API call should be approved or rejected. In the embodiments that express each policy in terms of policy opcode that has one or more rules that specify one or more conditions for approving or rejecting the API calls, the agent resolves these conditions based on the received and/or retrieved parameters. For instance, in some embodiments, the agent determines that one or more parameters in the received parameter set and/or retrieved parameter set match a condition specified by the policy opcode for rejecting the API call. In some embodiments, the conditions can specify reasons for allowing an API call.

Some API-authorization policies are resolved only by reference to the received parameter sets (i.e., only specify conditions that just need the received parameter sets to be resolved). Other API-authorization policies are resolved only by reference to the retrieved parameter sets (i.e., only specify conditions that just need the received parameter sets to be resolved). Still other API-authorization policies are resolved by reference to both the received and retrieved parameter sets (i.e., specify conditions that need both the received and retrieved parameter sets to be resolved).

After evaluating the retrieved policy, the local agent then sends (at 725) a reply message to the application API-validation agent 630 to return the results of its evaluation (e.g., to specify whether the API call should be allowed or rejected). In some embodiments, this reply message is an RPC reply message that is directed back to the application API-validation agent 630 through the network stack 615. Once the application API-validation agent 630 receives the reply from the local agent 620, it passes the local agent's approval or rejection of the API call to the API handler.

After directing (at 725) the validation agent to validate (i.e., authorize) the API call, the API handler (at 730) determines whether the application API-validation agent's reply indicates that the API call has been validated. If not, the API handler discards (at 735) the API call and the process 700 ends. In some embodiments, the API handler 626 not only discards the API call but also sends a reply to the source of the API call to reject the call.

On the other hand, when the API-validation agent 630 returns a reply that indicates that the API call has been approved (i.e., the API call is valid), the API handler 626 directs (at 740) the API-processing module 624 that is associated with the API call to perform the operation associated with the API call and to provide a reply message to the source of the API call to indicate the completion of this operation. In some cases, this operation requires an output to be generated and returned to the source of the API call or to some other destination. In these cases, the API processing module generates this output and provides this output to the source of the API call or to the other destination. After 740, the process 700 ends.

One of ordinary skill will realize that the process 700 is implemented differently in other embodiments. For instance, the API-processing application does not perform the authorization/authentication check operations of the process 700. Instead, a proxy authentication/authorization application performs these operations. In these embodiments, the proxy application first intercepts an API call intended for a second application, and sends a request (e.g., through RPC, IPC, etc.) to authorize this API call to the local agent. When the local agent authorizes this request, this proxy application then passes the API call to the second application, while discarding this call when the local agent rejects this call. In some embodiments, the proxy application not only intercepts API calls to obtain authorization for these calls, but also intercepts these calls to first have them authenticated by a separate authentication service.

Also, the process 700 discards an API call when this call is not authenticated. In other embodiments, the process 700 does not discard such an API call. For instance, in some embodiments, the process 700 passes the authentication failure of an API call to the local agent. This agent then uses this failure like a received parameter to resolve one or more conditions associated with the policy (retrieved from its namespace portion) that it evaluates to determine whether to authorize the API call.

Figure 8:
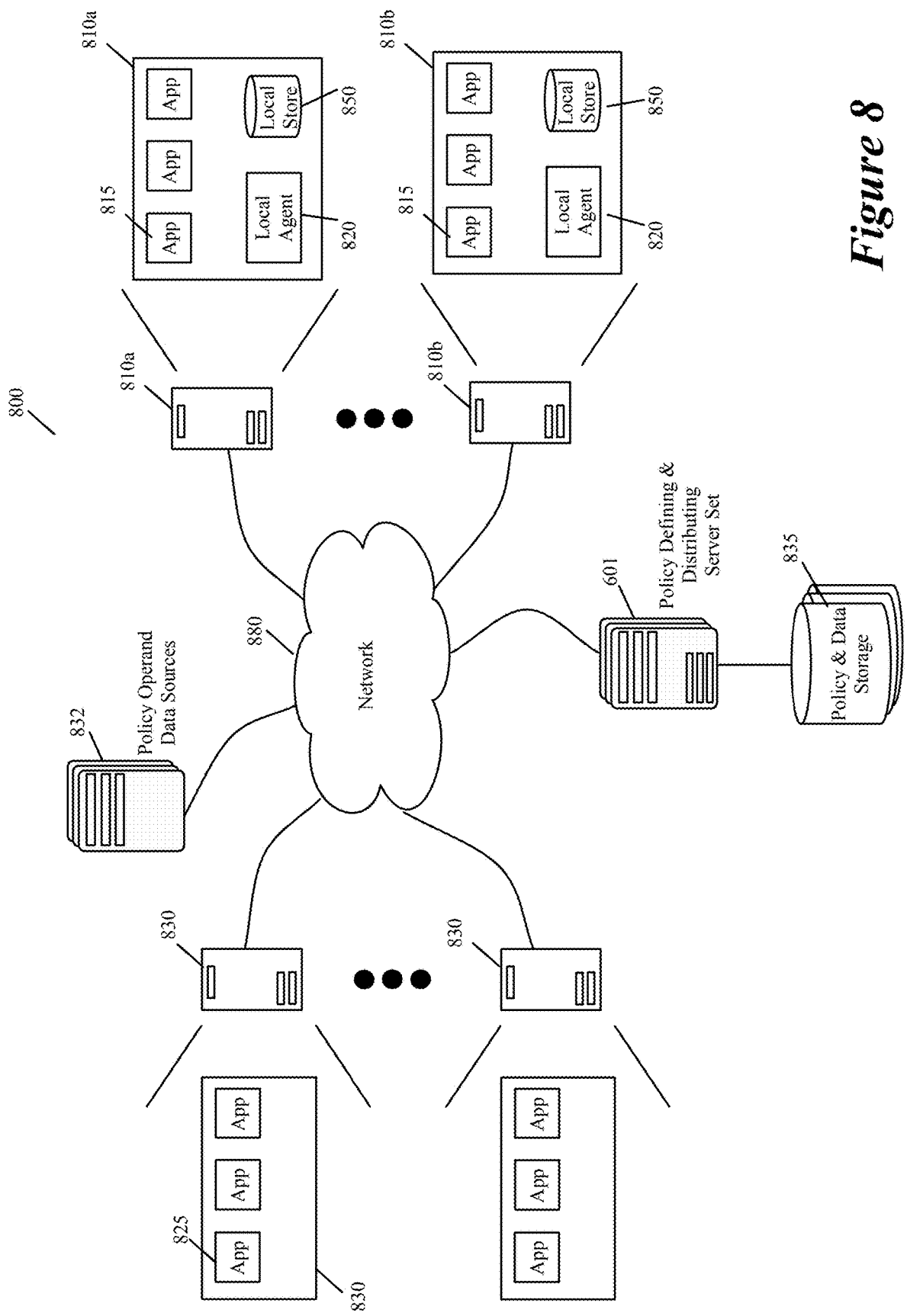
FIG. 8 illustrates a policy enforcement system of some embodiments of the invention.

FIG. 8 illustrates a policy enforcement system 800 of some embodiments of the invention. As shown, this system includes a server set 601, several host computers 810, a first set of applications 815 executing on the host computers 810, several local agents 820 executing on the host computers, and a second set of applications 825 executing on the same host computers 810 or other devices or computers 830. The various computers and devices of the system 800 communicatively connect to each other through a network 880, which can include one or more local area networks, wide area networks, wireless networks, a network of networks (e.g., Internet), etc.

The host computers 810 in some embodiments operate in one or more datacenters. In some embodiments, the server set 601 includes one or more servers that operate in the same datacenter as the host computers 810, while in other embodiments the server set operates in a different datacenter than one or more of the host computers. The server set 601 acts as a logically centralized resource for defining, storing, distributing and enforcing policies for authorizing API calls to the first set of applications 815 that execute sets of associated machines (e.g., VMs, containers, etc.) that execute on the host computers 810. In some embodiments, each set of associated machines is associated with one entity (e.g., belongs to a tenant in a multi-tenant datacenter or to one division of a corporation in a corporate datacenter). Accordingly, the server set can be used to define, store, distribute and enforce different sets of policies for authorizing API-calls for the set of applications 815 that belong to different entities (e.g., different tenants) in one or more datacenters.

In some embodiments, some of these applications execute on virtual machines (VMs) or containers on the host computers, while other applications execute over the operating systems of the host computers. Also, in some embodiments, some of the API calls to a set of associated applications 815 come from other applications in the same set, while other API calls to the application set come from other applications (e.g., applications 825). The second set of applications 825 execute on host computers or devices inside or outside of the server set's datacenter(s) for which the server set does not enforce policies.

To define and store policies, the server set 601 in some embodiments receives and stores definitions of several authorization policies for a number of API calls to a set of associated applications. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set 601 in some embodiments receives parameters for evaluating the policies. For one or more policy operand data sources 832 (e.g., from tenant LDAP directories, etc.) in the datacenter(s), the server set in some embodiments has one or more adapters that collect parameters from these data sources and store these parameters in order to evaluate the authorization policies to assess whether API calls should be authorized. The server set also allows such parameters to be entered through a web-based user interface.

For each set of related applications or machines (e.g., for each tenant in a multi-tenant datacenter), the server set in some embodiments stores the defined authorization policies and collected parameters in a single hierarchical storage structure 835. In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy, or stores one or more location-identifiers for one or more locations in the hierarchical storage structure at which the set collected parameters is previously stored in the structure. The hierarchical storage structure 835 in some embodiments is a namespace that stores the policies and the parameters for resolving these policies for the set of related machines.

In some embodiments, each authorization policy is defined by policy opcode in the namespace, while the parameter set for this authorization policy is defined as policy operands that are associated with the policy's opcode and that are stored in the namespace. The policy opcodes in some embodiments are written in a declarative language. Also, in some embodiments, the policy operands are written in a language-independent, structured format, such as JSON format or YAML (initially, "Yet Another Markup Language" and later, YAML Ain't Markup Language). Typically, such formats (e.g., JSON, YAML, etc.) are human readable. Alternatively, or conjunctively, in some embodiments, the policy operands are expressed in other formats, e.g., binary format, etc.

The server set 601 in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the data source adapters of the server set identify operand updates by retrieving the updates from the data source 832 of the operands through data pull operations and/or by receiving the updates from these data source 832 through data push operations.

In some embodiments, the server set distributes the defined policies and parameters to local agents 820 that enforce these API-authorization policies for the applications 815, and these local agents 820 store the distributed policies and parameters in their local policy/parameter store 850. In some of the embodiments that store the policies and parameters in a namespace, the server set distributes different portions of the namespace to different host computers based on the policies that are relevant to the API-authorization processing for the first set of applications 815 executing on the different host computers. The different portions that are distributed to the different host computers can be overlapping in some embodiments.

For instance, to a first computer 810*a*, the server set 601 distributes a first portion of the namespace that comprises policies and parameter sets relevant for processing API calls to a set of applications executing on the first computer, while distributing a second portion of the namespace that comprises policies and parameter sets relevant for processing API calls to a set of applications executing on the second computer 810*b*, with the first and second namespace portions differing in that at least one policy and at least one parameter set of the first portion is not in the second portion. These two namespaces can either have no policies or parameters in common, or have one or more policies and parameters in common. Each local agent 820 stores its local portion of the namespace that it receives from the server set 601 in its local policy/parameter store 850.

In some embodiments, the server set 601 uses a push model to distribute the policy/parameters (e.g., the relevant namespace portions) to each local agent 820. In other embodiments, the server set uses a pull model to distribute the policy/parameters. For instance, in these embodiments, once a local agent initializes, it queries the server set for policies and parameters relevant to it. In these embodiments, the local agent also periodically polls the server set to determine whether policies or parameters that the local agent previously received have been updated on the server set, and thereby need to be copied on the local agent's portion of the namespace. When such updates exist, the local agent retrieves them from the server set or receives them as part of its querying poll.

The local agent 820 executing on a host computer 810 receives requests to determine whether API calls received by one or more applications 815 executing on the host computer are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container). In other embodiments, the authorization module sends its API-authorization requests to the local agent through other mechanisms (such as other IPC (inter-process communication) messages) that again, initiate above the network stack.

In response to such a request, the local agent 820 uses one or more parameters associated with the API call to identify a policy (e.g., policy opcode) stored in its local policy storage (e.g., stored in its local namespace) to evaluate in order to determine whether the API call should be authorized. The received API-authorization request contains one or more parameters associated with the API call (e.g., one or more parameters that identify the API call, its type and/or other metadata about the API call). In some embodiments, at least one parameter in the request is received by the application in the API call.

For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

To evaluate the identified policy for the API call, the agent might also retrieve one or more parameters (e.g., operands) from the local policy storage (e.g., from its copy of the namespace). The local agent then uses the received or retrieved parameters to evaluate the retrieved API-authorization policy in order to determine whether the API call should be approved or rejected. For instance, in some embodiments, the retrieved policy opcode includes one or more rules that specify one or more conditions for approving or rejecting the API calls. The agent resolves these conditions based on the received or retrieved parameter(s) associated with the API call (e.g., the agent determines that one or more received or retrieved parameters match a condition specified by the policy opcode for rejecting an API call).

Based on this evaluation, the local agent then sends a reply to the application that sent the API-authorization request, to specify whether the API call should be approved or rejected. In some embodiments, the local agent sends its reply to the API-authorization request as an RPC reply message. When the API call is approved, the particular application then performs the operation associated with the API call, and if necessary, returns an output to the source of the API call (i.e., to the module that sent the API call) to the particular application. On the other hand, when the API call is rejected, the particular application sends the message to the source of the API call to reject the call, or simply discards this call without providing a response to the source of the API call.

In some embodiments, the local agents 820 operate in the same failure domain as the machines on which the applications 815 execute. For instance, when an application executes on a virtual machine (VM) or container, the local agent in some embodiments executes on the same VM or container as the application. In other embodiments, the local agent does not execute on the same VM or container as its associated application, but executes on the same host computer as the application's VM or container.

In some embodiments, each local agent 820 is associated with just one application 815 that executes on the same computer, same VM or same container as the local agent. In other embodiments, one local agent 820 in some embodiments can be shared by multiple applications 815 that execute on the same VM, container, or host computer as the agent. However, in a multi-tenant datacenter, some embodiments do not allow local agents to be shared by applications executing on different tenant computers, VMs or containers. Other embodiments, on the other hand, allow one local agent to be used by different applications of different tenants.

Some embodiments have the local agents 820 operate within the same failure domain as the applications (e.g., micro service applications) in order to ensure that the policy functionality remains highly available and responsive at all times. Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

As mentioned above, the server set 601 in some embodiments distributes policies and parameters to local agents 820 so that they can evaluate API-authorization requests locally. Conjunctively or alternatively, the server set 601 in some embodiments also processes API-authorization requests from some or all of the applications 815. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations can be gradually rejected, or a limited access to the application can be provided until the API calls are authorized.

Accordingly, in some embodiments, an API-authorization module of an application executing on a computer sends an API-authorization request (e.g., as an RPC message) to a local agent 820 on the same computer, and this local agent 820 forwards this request (e.g., as another RPC message) to the server set 601. In other embodiments, the API-authorization module of the application sends the API-authorization request (e.g., as an RPC message) directly to the server set 601.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set 601 then uses one or more parameters in the first parameter set to retrieve a policy (e.g., policy opcode) related to the API call from its policy/data storage 835 (e.g., from its namespace for the set of associated machines to which the application belongs). To evaluate this policy, the server set might also retrieve one or more parameters from its policy storage 835 that are relevant for assessing the retrieved policy (e.g., retrieve policy operands from its namespace for the set of associated machines to which the application belongs). These retrieved set of parameters serve as a second set of parameters associated with the API call.

The server set 601 then uses the received or retrieved parameters to evaluate the retrieved API-authorization policy in order to determine whether the API call should be approved or rejected. For example, in some embodiments, the server set resolves one or more conditions specified in the retrieved policy opcode based on one or more received or retrieved parameters (e.g., determines that one or more received or retrieved parameters match a condition specified by the policy opcode for rejecting an API call). Based on this evaluation, the server set 601 then sends a reply (e.g., an RPC reply message) to the local agent 820 or the application's authorization module to specify whether the API call should be approved or rejected. When this response is sent to the local agent 820, this agent then relays this message (e.g., as an RPC reply message) to the application's API-authorization module.

As mentioned above, the local policy and data storage 850 and the server policy and data storage 835 of some embodiments are hierarchical namespaces that store both policy opcode and policy operands that are needed for resolving the policy opcodes (i.e., both the code and the data on which the code operates). In some embodiments, the namespace is a document database in that it has no tables and instead is laid out as a single hierarchical document. This document forms one global namespace that holds all the data and policies. For instance, the following namespace structure is a hierarchical layout of a policy-and-document database that stores three JSON data documents and two policies:

/a/b/doc_1.json
/a/b/doc_2.json
/c/d/doc_3.json
/d/policy_A
/e/f/policy_B

In this example, there are two JSON documents at namespace location '/a/b' and a third JSON document at '/c/d', while the two policies are saved at '/d' and '/e/f'.

As a namespace merges the data and policies into one global hierarchical layout, database clients can access a nested portion of the namespace simply by requesting data by its fully qualified name. Moreover, to access a portion of policy operand document 1, the client can simply request the data with name:

/a/b/doc_l/some_portion.

The same applies to policies: the namespace evaluates the policies on-the-fly when the client accesses the namespace. That is, the client can simply access the results of a "policy evaluation" by referring the policy and its relevant portion. For instance, a client can request /e/f/policy_B/some_computed_result, which would make title database take the source of code of the policy B, compute the policy using any data necessary that the policy may need underneath and then pass the requested portion of the policy results back to the client.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
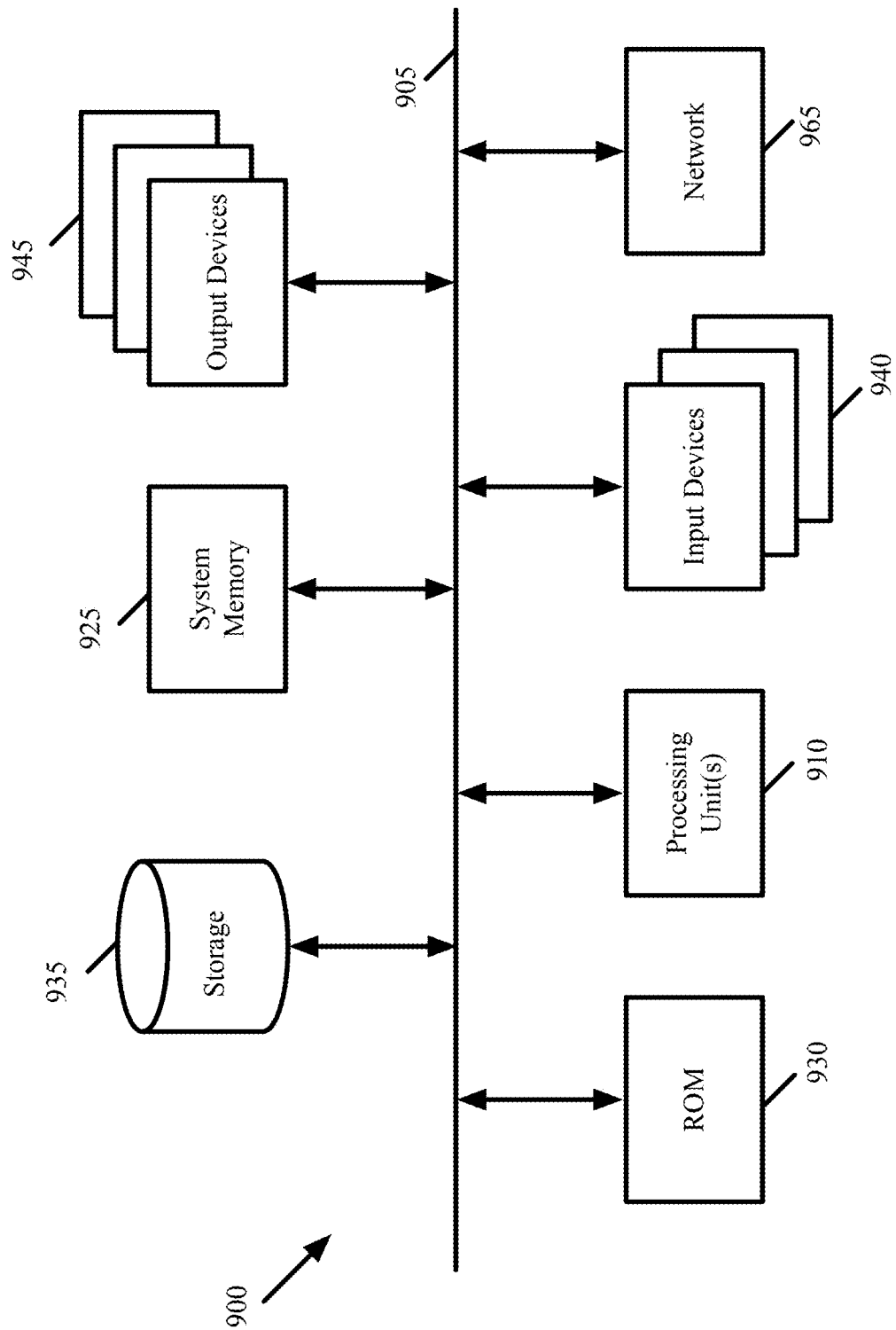
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. The electronic system 900 is also the control plane modules of the load balancer of some embodiments. As shown, the electronic system includes various types of computer readable media and interfaces for various other types of computer readable media. Specifically, the electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory (ROM) 930, the system memory 925, and the permanent storage device 935. From these various memory units, the processing unit(s) 910 retrieve instructions to execute and data to process in order to execute the processes of the invention. The processing unit(s) may be a single processor or a multi-core processor in different embodiments.

The ROM 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

While micro-services were mentioned as one type of applications that could get the benefit of the API-authorization processes and systems of some embodiments, one of ordinary skill will realize that these processes and systems of some embodiments are also used to authorize API calls for other types of applications, such as SSH (secure shell) applications or other types of applications. Also, in several embodiments described above, the API-authorization enforcement system enforces API-authorization policies for different sets of related machines in one or more datacenters. In other embodiments, the API-authorization enforcement system enforces API-authorization policies just based on the applications or types of applications executing on the computers. For instance, a datacenter can employ the API-authorization enforcement system of some embodiments for one or more application or application types of all of its tenants or users. In these embodiments, the policies are policies that are deployed based on application identity or type, and not based on association between related sets of machines executing in the datacenter.

Also, several of the above-described embodiments have the local agents and/or the server set evaluate the policies based on the operands to determine whether to allow or reject API calls. In other embodiments, the local agents or the server set configure the applications that receive the API calls, or other agents/processes in the datacenter authorize or reject API calls based on configurations that the local agents and/or server set push to these applications and/or other agents/processes. For instance, each time a local namespace portion is updated, the local agent or the server set in an AWS datacenter identifies the API calls affected by the update, determines whether these API calls should now be allowed or rejected, and pushes to the AWS IAM (Identity and Access Management) system new configuration data to ensure that these API calls are appropriately allowed or rejected.

In some embodiments, some or all of the local agent functionality is embedded in a plugin that is installed in the API-processing application. In this manner, some or all of the above-described operations of the local agents are performed by plugins installed in the API-processing applications in some embodiments. In other embodiments, instead of implementing these operations with plugins, some embodiments have the local agent and/or server set update API rule configuration file of an API-processing application whenever the local namespace associated with the application is modified and this modification affects the application's processing of one or more API calls. Therefore, one of ordinary skill in the art would understand that the invention is not to be limited by the foregoing illustrative details, but rather is to be defined by the appended claims.

The invention claimed is:

1. A method for processing API (application programming interface) requests received for an API server, the method comprising:
identifying an API request sent to the API server;
determining whether the API request requires modifications based on at least one pre-specified policy;
upon determination that the API request requires modifications based on the pre-specified policy, modifying the API request according to the pre-specified policy; and
forwarding the API request to the API server to process.

2. The method of claim 1, wherein determining whether the API request requires modifications comprises invoking a mutating webhook to query a policy agent.

3. The method of claim 2, wherein the policy agent comprises a set of policies for modifying API requests received for the API server.

4. The method of claim 2, wherein the policy agent identifies the pre-specified policy and determines that the API request requires modifications based on the pre-specified policy.

5. The method of claim 2, wherein modifying the API request according to the pre-specified policy comprises (i) receiving a patch to be applied to the API request from the mutating webhook and (ii) applying the patch to the API request, wherein the patch comprises the modifications.

6. The method of claim 1 further comprising determining whether the API request is valid based on at least one additional pre-specified policy.

7. The method of claim 6, wherein determining whether the API request is valid comprises invoking a validating webhook to query a policy agent.

8. The method of claim 7, wherein the policy agent comprises a set of policies for validating API requests received for the API server.

9. The method of claim 8, wherein the set of policies comprises custom default validation policies.

10. The method of claim 1, wherein if the API request does not require modifications based on the pre-specified policy, the API request is forwarded to the API server to process without modifying the API request.

11. A non-transitory machine readable medium storing a program for execution by a set of processing units, the program for processing API (application programming interface) requests received for an API server, the program comprising sets of instructions for:

identifying an API request sent to the API server;
determining whether the API request requires modifications based on at least one pre-specified policy;
upon determination that the API request requires modifications based on the pre-specified policy, modifying the API request according to the pre-specified policy; and
forwarding the API request to the API server to process.

12. The non-transitory machine readable medium of claim 11, wherein the set of instructions for determining whether the API request requires modifications comprises a set of instructions for invoking a mutating webhook to query a policy agent.

13. The non-transitory machine readable medium of claim 12, wherein the policy agent comprises a set of policies for modifying API requests received for the API server.

14. The non-transitory machine readable medium of claim 12, wherein the policy agent identifies the pre-specified policy and determines that the API request requires modifications based on the pre-specified policy.

15. The non-transitory machine readable medium of claim 12, wherein the set of instructions for modifying the API request according to the pre-specified policy comprises a set of instructions for (i) receiving a patch to be applied to the API request from the mutating webhook and (ii) applying the patch to the API request, wherein the patch comprises the modifications.

16. The non-transitory machine readable medium of claim 11, wherein the program further comprises a set of instructions for determining whether the API request is valid based on at least one additional pre-specified policy.

17. The non-transitory machine readable medium of claim 16, wherein the set of instructions for determining whether the API request is valid comprises a set of instructions for invoking a validating webhook to query a policy agent.

18. The non-transitory machine readable medium of claim 17, wherein the policy agent comprises a set of policies for validating API requests received for the API server.

19. The non-transitory machine readable medium of claim 18, wherein the set of policies comprises custom default validation policies.

20. The non-transitory machine readable medium of claim 11, wherein the program further comprises a set of instructions for, upon determination that the API request does not require modifications based on the pre-specified policy, forwarding the API request to the API server to process without modifying the API request.

* * * * *